Jan. 8, 1952        A. A. G. MAGIS        2,581,871
ACETYLENE GENERATOR
Filed Dec. 26, 1947
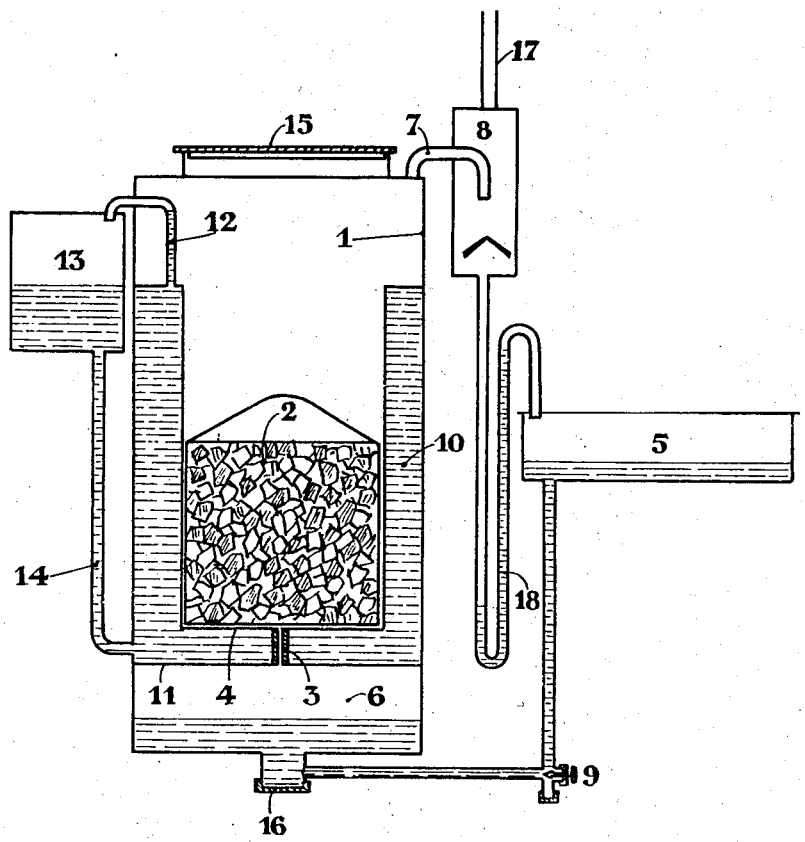
INVENTOR.
Auguste Adelin Gustave Magis
BY
Blair, Curtis + Hayward Patented Jan. 8, 1952

2,581,871

UNITED STATES PATENT OFFICE 2,581,871

ACETYLENE GENERATOR

Auguste Adelin Gustave Magis, Paris, France

Application December 26, 1947, Serial No. 793,951
In France October 23, 1941

Section 1, Public Law 690, August 8, 1946
Patent expires October 23, 1961

6 Claims. (Cl. 48—19)

This invention relates to apparatus for the generation of acetylene gas from calcium carbide and water.

In the apparatus hitherto employed for the production of acetylene by contact, a considerable amount of water is retained by the carbide and the residual lime when the contact is broken, whether this be effected by repulsion of the water by gas pressure, or by raising of the carbide basket out of the water by its suspension dome.

The object of the present invention is to ensure maximum drying of the mass of carbide and lime at the instant of its separation from the water, gas production being thus practically stopped when the demand ceases, and the dusty deposit left in the basket after extraction of a charge being rendered sufficiently dry to be emptied out without adhering to the basket.

It is clear that by thus preventing too-rapid generation, the risk of excessive temperatures, usually present in this type of generator, is considerably reduced.

In an acetylene generator according to the invention the carbide is contained in a basket placed within and resting directly on the bottom of the gas generating chamber in which terminates, for the admission of water, a narrow duct communicating with a supply tank containing water at a higher level, the pressure of the gas generated being determined by the height of the water level in such tank.

With such an arrangement the start of the reaction is gradual since initially only a small quantity of carbide is wetted, this quantity increasing as gas consumption rises and the gas pressure drops. If the demand is reduced or is terminated by closing of the gas outlet tap, the gas pressure increases and forces the water back towards the tank, some or all of the active carbide being left dry. If the gas pressure increases further owing to momentary generation after the outlet tap has been closed, the residual deposit itself is dried and gas production stops.

The arrangement permits the desired gas pressure to be selected by adjusting the height of the water level in the supply tank, and the rate of generation remains identical whether the value of the pressure be a few centimeters or several meters.

The water level in the supply tank may be adjusted by raising or lowering the tank itself, or such water level, and thus also the gas pressure, may be maintained substantially constant by constructing the water tank with a very wide upper section, the level therein being only slightly affected by the relatively small consumption of water by the reaction.

On the other hand, the maximum quantity of gas to be produced can be fixed in advance, regardless of the amount of carbide in the basket, by placing a corresponding quantity of water, approximately 0.5 liter per 300 liters of gas, in the supply tank. It is to be noted that, whatever the amount of fresh carbide in the basket, the production of gas will never exceed the rate determined by the maximum possible rate of gas delivery through the outlet tube or by the maximum rate of water delivery through the tube connecting the gas chamber with the supply tank. Conditions of safe working are thus always ensured by the manner of construction.

Gas production can be discontinued or be controlled more effectively by providing under the base of the gas chamber, and between it and the water supply tank, an auxiliary water reservoir which although filled with water during gas production, is adapted to receive the gas generated after cessation of the demand when the water is forced back towards the tank. More thorough drying and a more complete interruption of the gas production are thus ensured. Such auxiliary container thus acts as a very efficient compensating reservoir and contributes to the safety of the generator.

To absorb the heat evolved during the reaction and prevent polymerization, the sides and bottom of the gas chamber are preferably surrounded by a water jacket through which cooling water is circulated, it may be by thermo-syphon action or by a pump, or in which water for the reaction is stored prior to admission to the gas chamber.

The gas chamber may be provided with an integral base and a lid for filling and emptying, in which case the carbide basket may be dispensed with, or it may be of one-piece construction with an integral top closure and a detachable bottom plate.

The generator according to the invention is suitable equally for supplying internal combustion motors, welding equipment or illumination plant.

An embodiment of the invention will be described by way of example with reference to the accompanying drawing in which the sole figure shows a diagrammatic section of a generator having a separate water jacket for cooling of the gas generating chamber.

Referring now to the drawing, 1 is the main chamber for the gas generated during the decomposition, and 2 is the basket containing the carbide. A narrow duct 3 passing through the bottom 4 of the gas chamber connects such chamber, through a balancing reservoir 6, with a tank 5 containing the water of decomposition and open to atmosphere. The gas generated leaves the gas chamber by a tube 7 leading to a condenser 8 from which water of condensation may be returned to the tank 5, preferably by means of a water seal such as a syphon 18, and from which dried gas is taken through a delivery pipe 17.

The delivery of water may be regulated by a tap 9, the latter being adapted also, when desired, to stop completely the flow of water.

It is to be noted that the apparatus does not require a safety valve, the water supply tube and the tank themselves constituting an effective safety valve.

The chamber 1 has a double wall formed by a jacket 10 and base 11. The water contained in this jacket is heated by contact with the chamber wall, rises in the outlet tube 12, and drops into the tank 13, which may be open or closed, whence it is returned to the jacket in a cooled condition by way of the return tube 14.

The lid 15 which covers the chamber 1 serves for filling and emptying the generator, while a closure 16 allows cleaning of the balancing reservoir 6.

The tank 5 may receive all the water for decomposition corresponding to the carbide charge in the basket, or it may receive a part thereof, the remainder being supplied by successive deliveries say through a float-controlled cock, or from a constant level tank, and the height of the water tank may be varied to adjust the pressure of the gas generated.

Modifications may be applied to the apparatus described without departing from the invention. For example the bottom of the gas chamber and of the basket may be funnel-shaped, while a metal gauze or cloth filter may be placed between the charge of carbide and the water inlet.

I claim:

1. An acetylene generator including a closed chamber having a carbide-retaining compartment defined within lower portions of the chamber, said carbide-retaining compartment having an imperforate bottom except for a very narrow water supply duct therein, a water supply tank having communication with said duct, the sidewalls of the water supply tank extending upwardly with respect to the chamber a distance sufficient to provide a head of water adapted to act through said duct and balance the pressure of acetylene generated within the chamber, a gas outlet passageway leading from upper portions of said chamber, a condenser into which said gas passageway opens, a gas supply conduit leading from upper portions of said condenser, a condensate conduit leading from lower portions of said condenser, and said condensate conduit incorporating a U-tube-type pressure seal adapted to contain a column of condensate in balance with pressure of gas within said condenser, whereby as demand for acetylene ceases said acetylene pressure forces water out of contact with carbide in the carbide-retaining compartment and down through said narrow duct without blow-by of gas.

2. The invention of claim 1 wherein the cross-sectional area of said very narrow duct is minute as compared with the cross-sectional area of the bottom of the chamber.

3. The invention of claim 1 wherein a make-up water supply communicates with said water passageway.

4. The invention of claim 1 wherein said condensate conduit empties into said water supply tank.

5. The invention of claim 1 wherein said chamber is cooled by a secondary heat exchange system including a cooling jacket partially surrounding said chamber.

6. An acetylene generator including a closed chamber having a carbide-retaining compartment therein, said carbide-retaining compartment having an imperforate bottom except for a water-supply duct therein which has a minute cross-sectional area compared with the cross-sectional area of the bottom of the compartment, said duct communicating at its lower extremity with a sub-chamber adapted to contain water supplied from a supply tank positioned at an elevation with respect to the carbide compartment sufficient to balance the acetylene pressure generated and also adapted to receive water from said compartment when acetylene pressure exceeds a predetermined value, a gas outlet at the upper portion of said compartment, a condenser into which said gas outlet opens, a gas supply conduit leading from an upper portion of said condenser, and a condensate conduit leading from a lower portion of the condenser, said condensate conduit incorporating a U-tube-type pressure seal open to the atmosphere at its discharge end and adapted to balance acetylene pressure in the condenser.

AUGUSTE ADELIN GUSTAVE MAGIS.

REFERENCES CITED

The following references are of record in the file of this patent:

UNITED STATES PATENTS

| Number | Name | Date |
|---|---|---|
| 563,457 | Dickerson | July 7, 1896 |
| 602,189 | Vincent | Apr. 12, 1898 |
| 611,577 | Griffin | Sept. 27, 1898 |